United States Patent
Colonna et al.

(10) Patent No.: US 11,575,614 B2
(45) Date of Patent: Feb. 7, 2023

(54) MANAGING INPUT/OUTPUT PRIORITY BASED ON RESPONSE TIME

(71) Applicant: International Business Machines Corporation, Armonk, NY (US)

(72) Inventors: Christopher J. Colonna, Ossining, NY (US); Pasquale A. Catalano, Wallkill, NY (US); Stephen Robert Guendert, Poughkeepsie, NY (US); Michael James Becht, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 17/218,266

(22) Filed: Mar. 31, 2021

(65) Prior Publication Data
US 2022/0321488 A1 Oct. 6, 2022

(51) Int. Cl.
*H04L 47/283* (2022.01)
*H04L 43/0852* (2022.01)
*H04L 47/24* (2022.01)

(52) U.S. Cl.
CPC ........ *H04L 47/283* (2013.01); *H04L 43/0852* (2013.01); *H04L 47/24* (2013.01)

(58) Field of Classification Search
CPC .... H04L 47/283; H04L 43/0852; H04L 47/24
See application file for complete search history.

(56) References Cited

U.S. PATENT DOCUMENTS

| 10,268,526 | B1 | 4/2019 | Martin | |
|---|---|---|---|---|
| 10,282,107 | B1 | 5/2019 | Martin et al. | |
| 10,528,256 | B2 | 1/2020 | Brown et al. | |
| 10,567,290 | B2 | 2/2020 | Cavaliere et al. | |
| 2021/0109658 | A1* | 4/2021 | Mallick | G06F 9/505 |
| 2022/0129195 | A1* | 4/2022 | Kanjirathinkal | G06F 3/0613 |
| 2022/0206871 | A1* | 6/2022 | Armangau | G06F 9/5016 |

OTHER PUBLICATIONS

Disclosed Anonymously, "Method and System for Assigning Storage Access Priorities to Input/output Intensive Host Applications in a Cloud Storage Network", IP.com No. IPCOM000236547D, Publication Date: May 2, 2014, 7 pages.

(Continued)

*Primary Examiner* — Kibrom T Hailu
(74) *Attorney, Agent, or Firm* — Cantor Colburn LLP; Edward Wixted

(57) ABSTRACT

Aspects include selecting a channel group from a plurality of channel groups for an I/O operation. Each channel group in the plurality of channel groups is associated with a priority level and includes one or more channels. The selecting is based on a priority level assigned to the I/O operation and the priority level associated with the selected channel group. The I/O operation is driven on a selected channel in the selected channel group. A response time for the I/O operation is recorded and an average I/O response time for the selected channel is calculated. It is determined whether the plurality of channel groups should be reformed based at least in part on the calculated average response time for the selected channel. The plurality of channel groups are reformed in response to determining that the plurality of channel groups should be reformed.

15 Claims, 6 Drawing Sheets

(56) References Cited

OTHER PUBLICATIONS

Disclosed Anoymously, "Method of Controlling Input/Output Devices in Network", IP.com No. IPCOM000238296D, Publication Date: Aug. 15, 2014, 4 pages.
Hahn et al., "FastTrack: Foreground App-Aware I/O Management for Improving User Experience of Android Smartphones" Usenix, 2018, 14 pages.
Siemens, "Cycle and Response Times", Simatic, 2014, 31 pages.
Peter Mell et al., The NIST Definition of Cloud Computing, Recommendations of the National Institute of Standards and Technology, NIST, Special Publication 800-145, 7 pages.

\* cited by examiner

MANAGING INPUT/OUTPUT PRIORITY BASED ON RESPONSE TIME

BACKGROUND

The present invention relates generally to computer processing, and more specifically, to managing input/output (I/O) priority based on response time.

SUMMARY

Embodiments of the present invention are directed to managing input/output (I/O) priority based on response time. A non-limiting example computer-implemented method includes selecting a channel group from a plurality of channel groups for an I/O operation. Each channel group in the plurality of channel groups is associated with a priority level and each channel group includes one or more channels. The selecting of the channel group is based on a priority level assigned to the I/O operation and the priority level associated with the selected channel group. The I/O operation is driven on a selected channel in the selected channel group. A response time for the I/O operation is recorded in response to the I/O operation completing. An average I/O response time for the selected channel is calculated based at least in part on the recorded response time for the I/O operation. It is determined whether the plurality of channel groups should be reformed based at least in part on the calculated average response time for the selected channel. The plurality of channel groups are reformed in response to determining that the plurality of channel groups should be reformed, and the reforming includes one or both of adding and removing a channel from at least one of the channel groups in the plurality of channel groups.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
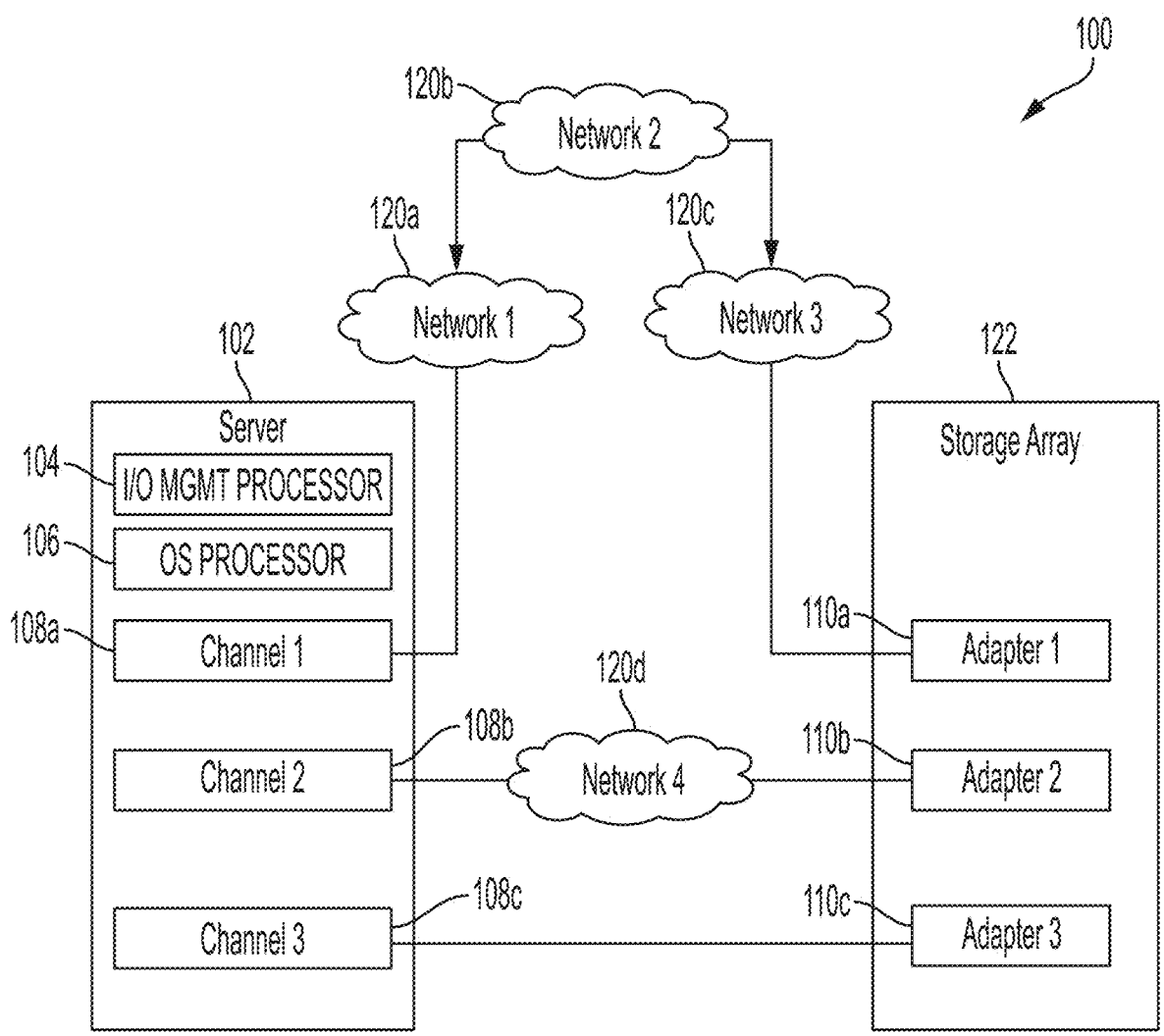
FIG. 1 depicts a block diagram of a system for managing input/output (I/O) priority based on response time according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention are directed to managing input/output (I/O) priority based on response time. One or more embodiments are utilized by systems where there is a choice of multiple paths, or channels, to drive an I/O to a storage subsystem, or storage array. In accordance with one or more embodiments of the present invention, an I/O management processor maintains a record of response times for each path. When an I/O operation is requested, it is given a priority. The higher priority I/Os are driven down the paths with the lower response times, and the lower priority I/Os are driven down the paths with the higher response times.

There are several contemporary approaches to prioritizing an I/O operation including the order of execution, the amount of resource applied, and the use of dedicated resources. For a FICON® configuration, for example, there can be up to eight channels that an I/O operation can be driven down, also known as a path group. There can be a disparity in the performance of the eight channel paths caused by load, hardware generation, and physical configuration (e.g., distance or number of cascaded switch hops to the control unit (CU) port). Currently, there is no way to prioritize an I/O operation based on latency though the goal of prioritization is to decrease the I/O response times.

For contemporary FICON configurations, an I/O processor (IOP) measures command response time (CMR), and the IOP uses CMR as a way to balance channel paths to a device (e.g., a storage array). CMR measures a round-trip latency that covers the time span from when a command is sent from a channel to a device, to the time that a response to the command is received at the channel from the device. The IOP can implement CMR by saving timestamps associated with the time that the command is sent, or driven, on the channel and the time that the response is received on the channel. The IOP uses a weighted round robin, sending more I/O down channels with better response times in an effort to balance the response times between channel paths. Sending more I/O down a channel with a better response time will slow the response time of the channel and thus, the round robin feedback loop used by the IOP leads to a leveling of CMR times between channel paths. In addition, the leveling of I/O response times between channels can result in lower priority work being sent down channels with faster response times than higher priority work.

One or more embodiments of the present invention address one or more of the shortcomings of contemporary I/O management techniques by grouping channels into priority levels based on their I/O response times, assigning priority levels to I/O operations, and driving I/O operations on channels in channel groups that are selected based on the priority levels of the I/O operations and the channel groups.

In addition, the makeup of each priority group can change based on on-going measurements of I/O response times at each channel. One or more embodiments of the present invention can utilize a weighted round robin to choose a channel in the selected channel group for an I/O operation and thus, response times may become leveled within the channel groups. However, unlike contemporary approaches, response times will not become leveled across all of the channels and lower priority work will not be sent down channels with faster response times than higher priority work.

In accordance with one or more embodiments of the present invention, the measuring of I/O response times and rebalancing, or reforming, of the channel groups is being performed continuously. High priority work, or I/O operations, can move from channel to channel (or path to path) based on changes in I/O response times of the available channels. If an abundance of high priority I/O is driven, it will still go to faster paths than lower priority I/O.

FICON is just one example of an I/O interface for connecting servers to storage devices that can utilize one or more embodiments of the present invention. Embodiments of the present invention can be utilized by other I/O interfaces such as, but not limited to, Fiber Channel, Ethernet, Remote Direct Memory Access (RDMA), Non-Volatile Memory Express (NVMe), and Peripheral Component Interconnect Express (PCIe).

Turning now to FIG. 1, a block diagram 100 of a system for managing I/O priority based on response time is generally shown in accordance with one or more embodiments of the present invention.

The components shown in the embodiment of FIG. 1 include a server 102 and a storage array 122 which is an example of a storage subsystem. The components also include Network 1 120a, Network 2 120b, Network 3 120c, and Network 4 120d, which are referred to herein collectively as networks 120. The networks 120 shown in FIG. 1 are used to couple the server 102 to the storage array 122 for processing I/O operations. The networks 120 can be implemented using any one or more short range or long range wired or wireless networks known in the art. Each of the networks 120 can be implemented using different network technologies, or two or more of the networks 120 can be implemented using the same network technology(s). In one or more embodiments of the present invention, at least a portion of one or more of the networks 120 is implemented by at least a portion of cloud environment 50 of FIG. 4 and/or network 612 of FIG. 6.

The server 102 shown in FIG. 1 includes I/O management processor 104 and operating system (OS) processor 106, as well as Channel 1 108a, Channel 2 108b, and Channel 3 108c, which are referred to collectively herein as channels 108. In accordance with one or more embodiments of the present invention, the OS processor 106 executes an OS that receives requests to perform I/O operations and assigns priority levels to the I/O operations before sending them to the I/O management processor 104. In accordance with one or more embodiments of the present invention, the I/O management processor 104 receives the I/O operations and their assigned priorities, selects channels 108 and drives I/O operations on the selected channels.

The channels 108 shown in FIG. 1 are used to drive execution of an I/O operation at storage array 122. The storage array 122 shown in FIG. 1 includes Adapter 1 110a, Adapter 2 110b, and Adapter 3 110c, which are referred to collectively herein as adapters 110. A storage array, such as storage array 122, includes storage devices (not shown) and additional software and/or hardware for performing I/O operations (e.g., reads, writes) to data located in the storage devices. The adapters 110 shown in FIG. 1 can receive the I/O operations and transmit them to a controller (not shown) of the storage array 122 that performs the requested I/O operations. At least a portion of the server 102 and/or the storage array 122 may be implemented by at least a portion of a cloud computing node 10 of FIG. 4 and/or computer system 600 of FIG. 6.

As shown in FIG. 1, Channel 1 108 has to traverse three networks (Network 1 120a, Network 2 120b, and Network 3 120c) to reach storage array 122, Channel 2 108b has to traverse only one network (Network 120d), and Channel 3 108c is directly connected to storage array 122 via a cable or other physical connector). At least a subset of the channels 108 and the adapters 110 may have different levels of utilization, as can the network(s) 120 between them, resulting in different I/O response times across the channels. Additional variation in I/O response time between the channels can be caused by at least a subset of the channels 108 and the adapters 110 being at different hardware level with different capabilities. The response time for an I/O operation can depend on factors such as, but not limited to, physical configuration, amount of workload being performed by each component, and the physical capability of each component.

For ease of description, FIG. 1 shows three channels 108 on server 102. One skilled in the art will recognize that one or more embodiments of the invention can include a server with eight or sixteen or hundreds or thousands of channels connecting to storage array 122 and/or to one or more other storage arrays (not shown). Also, for ease of description, FIG. 1 shows three adapters 110 on storage array 122. One skilled in the art will recognize that one or more embodiments of the invention can include a storage array with eight or sixteen or hundreds or thousands of adapters connecting to server 102 and/or to one or more other storage arrays (not shown).

The embodiments described herein with respect to block diagram 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It is to be understood that the block diagram of FIG. 1 is not intended to indicate that the system is to include all of the components shown in FIG. 1. Rather, the system can include any appropriate fewer or additional components not illustrated in FIG. 1 such as, but not limited to one or more additional channels 108, adapters 110 and/or networks 120. In addition, the components shown in FIG. 1 may be arranged differently. For example, the O/S processor 106 and the I/O management processor 104 may located on different servers, or they may part of the same processor.

Figure 2:
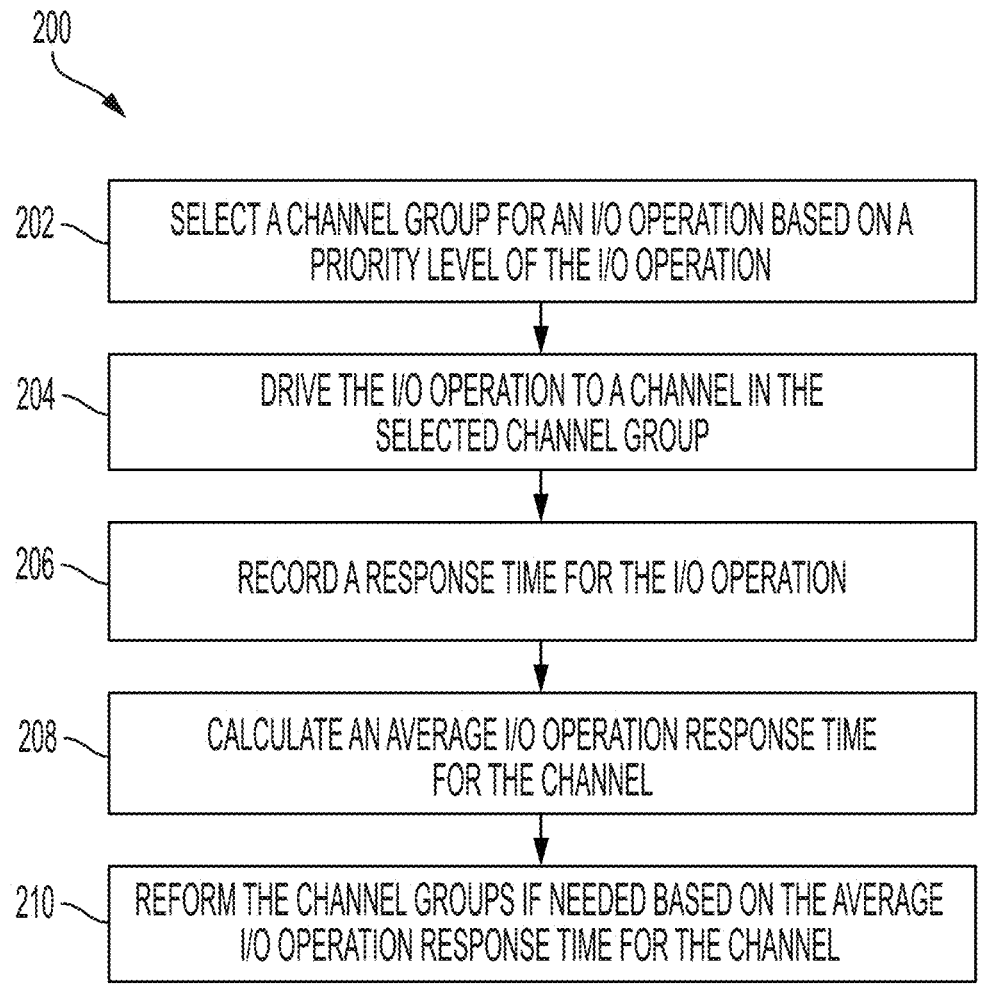
FIG. 2 depicts a flow diagram of a method for managing I/O priority based on response time according to one or more embodiments of the present invention.

Turning now to FIG. 2, a flow diagram 200 of a method for managing I/O priority based on response time is generally shown in accordance with one or more embodiments of the present invention. All or a portion of the processing shown in FIG. 2 can be performed, for example, by computer instructions executed by I/O management processor 104 of FIG. 1.

At block 202 of FIG. 2, a channel group is selected for an I/O operation based on a priority level of the I/O operation. In accordance with one or more embodiments of the present invention, computer instructions executed by an I/O management processor (e.g., I/O management processor 104 of FIG. 1) group channels (e.g., the channels 108 of FIG. 1) that provide a path from a server (e.g., server 102 of FIG. 1) to adapters (e.g., adapters 110 of FIG. 1) at a storage array (e.g., storage array 122 of FIG. 1) into different priority groups. In accordance with one or more embodiments of the present invention, prior to driving I/O operations on the channels, the I/O management processor groups the channels into priority groups. For example, if I/O operations can be assigned three different priority levels (e.g., high, medium, low), then the I/O management processor can group the channels into three groups each corresponding to a priority level. In accordance with one or more embodiments of the present invention where there are six channels, the two channels predicted to have the fastest I/O response time can be included in a group associated with a high priority level, the two channels predicted to have the slowest I/O response time can be included a group associated with a low priority, and the two remaining channels can be included in a group associated with a medium priority.

The grouping described above is just one example of how groups of channels can be formed and any approach to grouping may be implemented by one or more embodiments of the present invention. For example, the groups do not have to have an equal number of channels, which may be an approach taken when a large number of high priority I/O operations are expected. In addition, the number of channels included in each group and the channels that make up each group can be modified during system operation based on factors such as, but limited to, measured I/O response times, quality of service (QOS) levels, and expected priority mix and/or volume of future I/O operations.

Referring back to FIG. 2, at block 204, the I/O operation is driven on a channel in the channel group that was selected at block 202. The channel within the channel group can be selected, for example, using a weighted round robin approach. At block 206, a response time is recorded for the I/O operation. The recording can include saving a first timestamp that reflects when the I/O operation was driven on the channel and a second timestamp that reflects when a response to the I/O operation was received at the channel. In accordance with one or more embodiments of the present invention, the response indicates that the I/O operation has completed. The time difference between these two timestamps is the actual, or measured, I/O response time for the I/O operation on the channel.

At block 208, an average I/O operation response time is calculated for the channel. The calculating can take into account I/O operation response times over a specified timeframe (e.g. ten seconds, one minute, five minutes, one hour, one day) which may vary depending on factors such as, but not limited to time of day and volume. In one or more embodiments of the present invention, the calculating takes into account the last "x" number of I/O operations driven on the channel. Other embodiments of the present invention can use a combination of these two approaches to derive an average I/O response for a channel.

At block 210, it is determined whether the channel groups should be reformed based, for example on the average response times of at least a subset of the channels. Based on the determination, the channel groups are reformed if needed. For example, it may be determined that a first channel in a high priority channel group is currently exhibiting an average I/O response time that is higher than a second channel in a medium priority channel group. In this case, the reforming of the channel groups may include moving the first channel into the medium priority channel group and moving the second channel into the high priority channel group.

The processing shown in FIG. 2 may be performed for every I/O operation that is driven on any of the channels in the groups of channels. Alternatively, blocks 202 to 206 may be performed for every I/O operation that is driven, but blocks 208 and 210 may performed on a periodic basis. The periodic basis can be after a specified number of I/O operations and/or after a specified time interval (e.g. one second, two seconds, one minute, thirty minutes, etc.). One or more embodiments can switch between these approaches based for example, on expected or actual volumes of I/O operations on the channels.

The process flow diagram of FIG. 2 is not intended to indicate that the operations are to be executed in any particular order, or that all of the operations shown in FIG. 2 are to be included in every case. Additionally, the processing shown in FIG. 2 can include any suitable number of additional operations.

Figure 3:
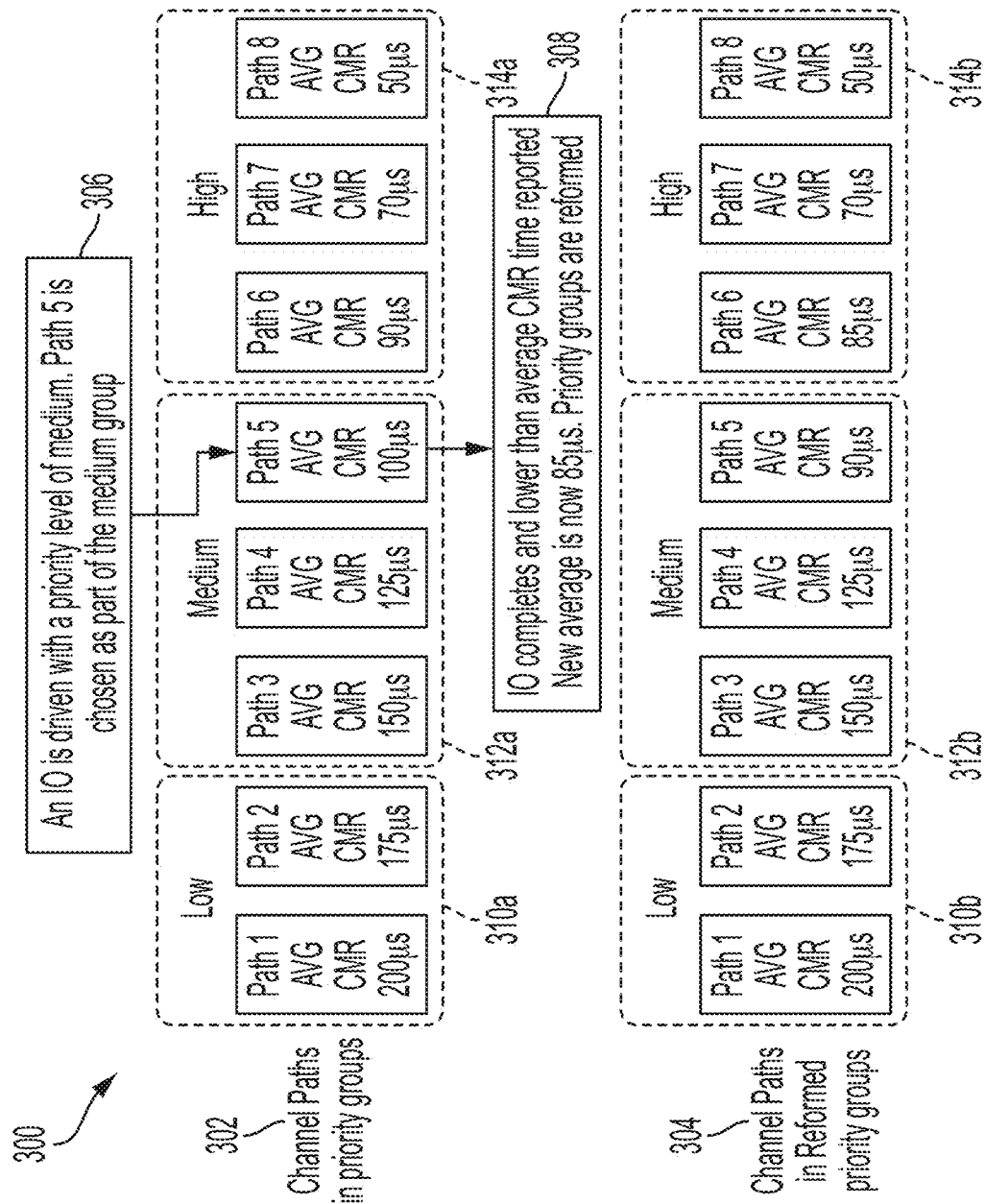
FIG. 3 depicts a block diagram of reforming channel groups according to one or more embodiments of the present invention.

Turning now to FIG. 3, a block diagram 300 of reforming channel groups is generally shown in accordance with one or more embodiments of the present invention. The block diagram 300 shows channel paths arranged in priority groups 302. Channel group 310a is associated with a low priority level and the paths, or channels, in this channel group include Path 1 with an average I/O response time of 200 microseconds (μs) and Path 2 with an average I/O response time of 175 μs. Channel group 312a is associated with a medium priority level and the paths, or channels, in this channel group include Path 3 with an average I/O response time of 150 μs, Path 4 with an average I/O response time of 125 μs, and Path 5 with an average I/O response time of 100 μs. Channel group 314a is associated with a high priority level and the paths, or channels, in this channel group include Path 6 with an average I/O response time of 90 μs, Path 7 with an average I/O response time of 70 μs, and Path 8 with an average I/O response time of 50 μs.

As shown in block 306 of FIG. 3, an I/O operation with a priority level of medium is driven on Path 5 in channel group 312a. As shown in block 308 of FIG. 3, the I/O completes and a lower than expected CMR time, or I/O response time, is reported and now the average I/O response time for Path 5 is 85 μs. Based on Path 5 having a lower average I/O response time than Path 6 (Path 6 has an average I/O response time of 90 μs), the channel groups are reformed.

The channel paths in reformed priority groups 304 include channel group 310b which is associated with a low priority level and the same paths, or channels, as channel group 310a. Channel group 312b is associated with a medium priority level and the paths, or channels, in this channel group now include Path 3 with an average I/O response time of 150 μs, Path 4 with an average I/O response time of 125 μs, and Path 6 with an average I/O response time of 90 μs. Channel group 314b is associated with a high priority level and the paths, or channels, in this channel group now include Path 5 with an average I/O response time of 85 μs, Path 7 with an average I/O response time of 70 μs, and Path 8 with an average I/O response time of 50 μs.

In this manner, the channels groups are continuously monitored and reformed to ensure that high priority I/O operations will be driven on the channels with the lowest latencies.

One or more embodiments of the present invention provide a storage area network (SAN) traffic priority based routing scheme that includes calculating an average CMR, or I/O response time, for each path from a source device to a destination device; data traffic tagged with a priority, and an I/O subsystem manager (e.g., executing on I/O management processor 104). The data traffic to be routed is sent to the I/O subsystem manager and the I/O subsystem manager monitors all paths from the source device to a destination device using CMR, establishes a ranked list of paths based on the average CMR time, divides the paths into priority groupings, and selects a path from a group to transmit the data on based on a match of the group priority to the priority of the data packet.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
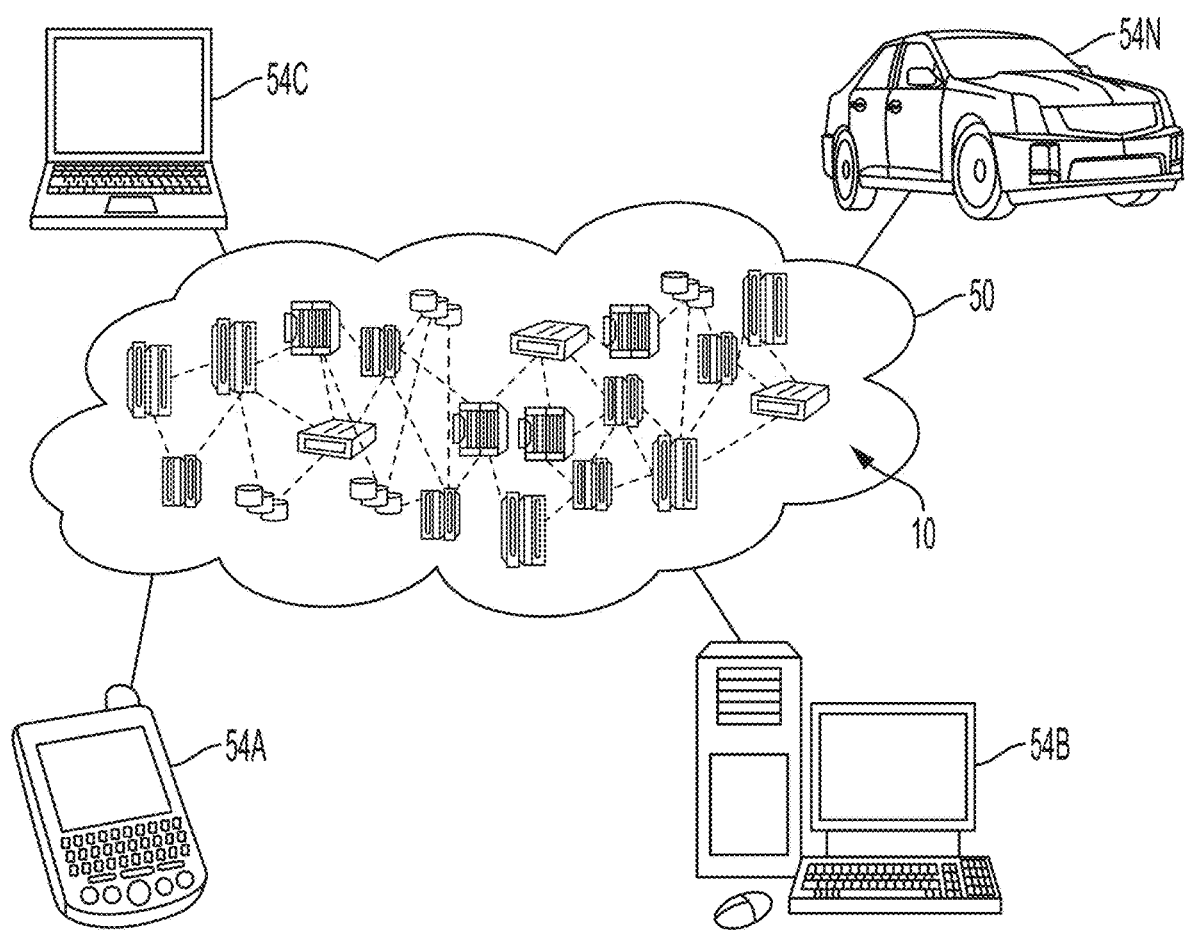
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
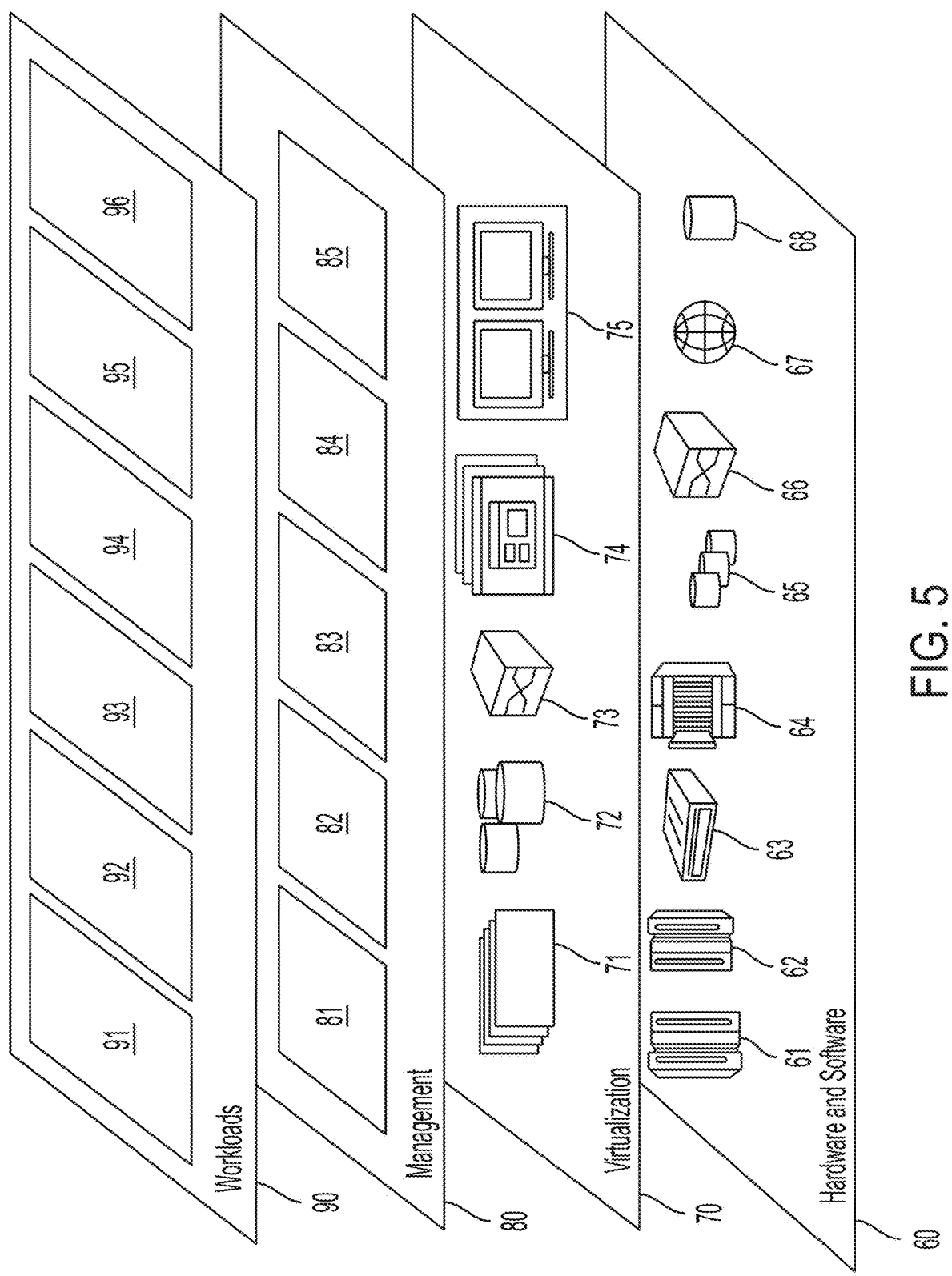
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Figure 6:
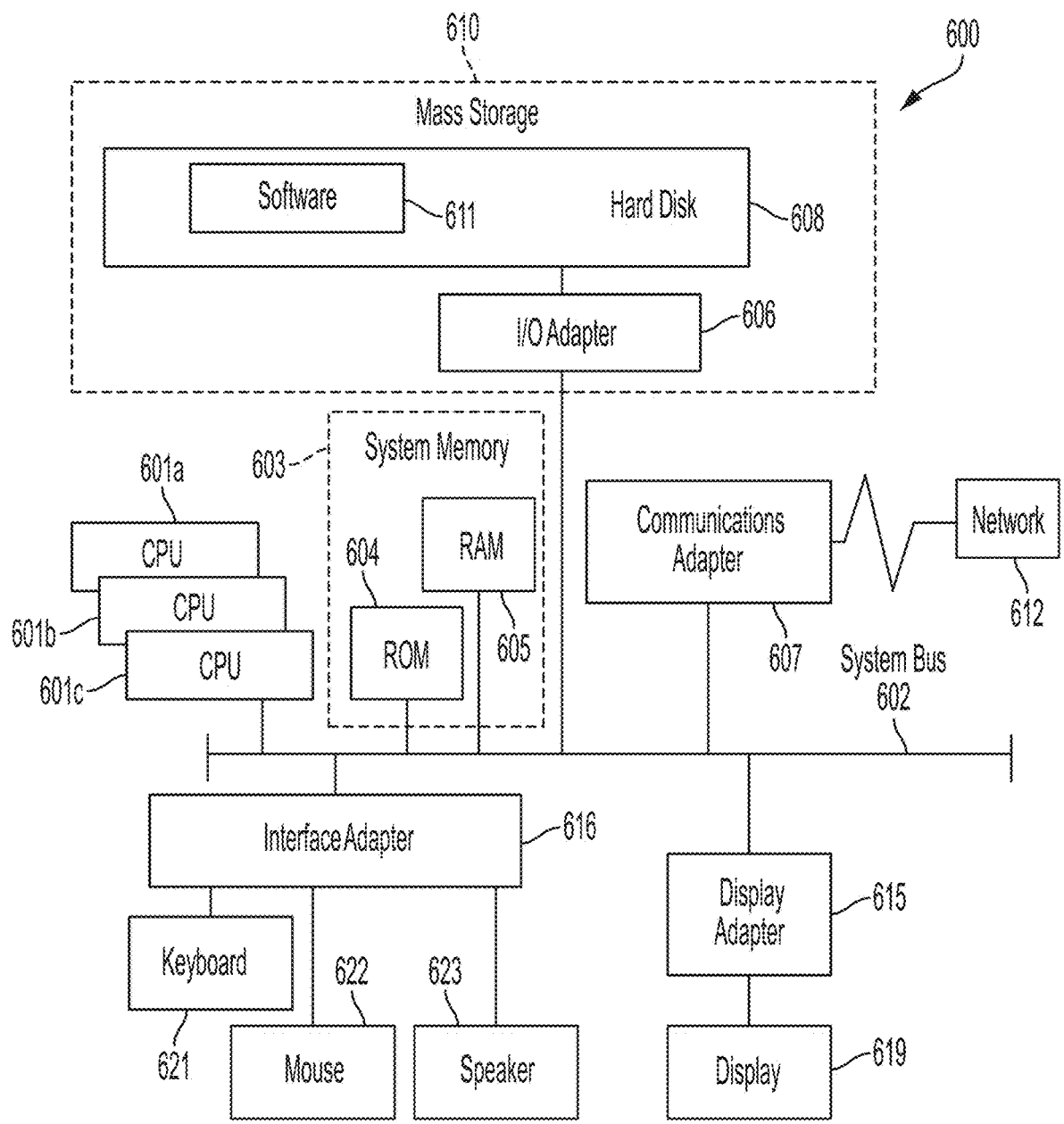
FIG. 6 illustrates a system for managing I/O priority based on response time according to one or more embodiments of the present invention.

Turning now to FIG. 6, a computer system 600 is generally shown in accordance with an embodiment. All or a portion of the computer system 600 shown in FIG. 6 can be implemented by one or more cloud computing nodes 10 of FIG. 4. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a serial advanced technology attachment (SATA) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS® or AIX® operating system, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
    selecting a channel group from a plurality of channel groups for an input/output (I/O) operation, each channel group in the plurality of channel groups assigned a priority level and including one or more channels, the selecting based on a priority level assigned to the I/O operation and the priority level assigned to the selected channel group;
    driving the I/O operation on a selected channel in the selected channel group;
    recording a response time for the I/O operation, the recording in response to the I/O operation completing;
    calculating an average I/O response time for the selected channel based at least in part on the recorded response time for the I/O operation;
    determining whether the plurality of channel groups should be reformed based at least in part on the calculated average response time for the selected channel; and
    reforming the plurality of channel groups in response to determining that the plurality of channel groups should be reformed, the reforming comprising one or both of adding and removing a channel from at least one of the channel groups in the plurality of channel groups based at least in part on average I/O response times of channels in each of the plurality of channel groups,
    wherein the priority levels assigned to the channel groups include low, medium, and high, and a priority level is assigned to each of the channel groups based at least in part on the average I/O response times of the channels in each of the channel groups.

2. The method of claim 1, wherein a channel group assigned a first priority level includes channels having lower average I/O response times than channels included in a channel group assigned a second priority level that is lower than the first priority level.

3. The method of claim 1, wherein the calculating, determining, and reforming are performed in response to the I/O operation completing.

4. The method of claim 1, wherein the calculating, determining, and reforming are performed on a periodic basis.

5. The method of claim 1, wherein the priority level is assigned to the I/O operation by an operating system.

6. The method of claim 1, wherein all of the channels in the plurality of channel groups are coupled to a same storage array.

7. The method of claim 1, further comprising selecting the selected channel in the selected channel group, the selecting the selected channel comprising applying an algorithm that attempts to balance response times between channels in the selected channel group.

8. A system comprising:
    one or more processors for executing computer-readable instructions, the computer-readable instructions controlling the one or more processors to perform operations comprising:
        selecting a channel group from a plurality of channel groups for an input/output (I/O) operation, each channel group in the plurality of channel groups assigned a priority level and including one or more channels, the selecting based on a priority level assigned to the I/O operation and the priority level assigned to the selected channel group;
        driving the I/O operation on a selected channel in the selected channel group;
        recording a response time for the I/O operation, the recording in response to the I/O operation completing;
        calculating an average I/O response time for the selected channel based at least in part on the recorded response time for the I/O operation;
        determining whether the plurality of channel groups should be reformed based at least in part on the calculated average response time for the selected channel; and
        reforming the plurality of channel groups in response to determining that the plurality of channel groups should be reformed, the reforming comprising one or both of adding and removing a channel from at least one of the channel groups in the plurality of channel groups based at least in part on average I/O response times of channels in each of the plurality of channel groups,
        wherein the priority levels assigned to the channel groups include low, medium, and high, and a priority level is assigned to each of the channel groups based at least in part on the average I/O response times of the channels in each of the channel groups.

9. The system of claim 8, wherein a channel group assigned a first priority level includes channels having lower average I/O response times than channels included in a channel group assigned a second priority level that is lower than the first priority level.

10. The system of claim 8, wherein the calculating, determining, and reforming are performed in response to the I/O operation completing.

11. The system of claim 8, wherein the calculating, determining, and reforming are performed on a periodic basis.

12. The system of claim 8, wherein the priority level is assigned to the I/O operation by an operating system.

13. The system of claim 8, wherein all of the channels in the plurality of channel groups are coupled to a same storage array.

14. The system of claim 8, wherein the operations further comprise selecting the selected channel in the selected channel group, the selecting the selected channel comprising applying an algorithm that attempts to balance response times between channels in the selected channel group.

15. A computer program product comprising a non-transitory computer-readable storage medium having program instructions embodied therewith, the program instructions executable by one or more processors to cause the one or more processors to perform operations comprising:

selecting a channel group from a plurality of channel groups for an input/output (I/O) operation, each channel group in the plurality of channel groups assigned a priority level and including one or more channels, the selecting based on a priority level assigned to the I/O operation and the priority level assigned to the selected channel group;

driving the I/O operation on a selected channel in the selected channel group;

recording a response time for the I/O operation, the recording in response to the I/O operation completing;

calculating an average I/O response time for the selected channel based at least in part on the recorded response time for the I/O operation;

determining whether the plurality of channel groups should be reformed based at least in part on the calculated average response time for the selected channel; and reforming the plurality of channel groups in response to determining that the plurality of channel groups should be reformed, the reforming comprising one or both of adding and removing a channel from at least one of the channel groups in the plurality of channel groups based at least in part on average I/O response times of channels in each of the plurality of channel groups, wherein the priority levels assigned to the channel groups include low, medium, and high, and a priority level is assigned to each of the channel groups based at least in part on the average I/O response times of the channels in each of the channel groups.

* * * * *